US011429207B2

(12) United States Patent
Ninomiya et al.

(10) Patent No.: US 11,429,207 B2
(45) Date of Patent: Aug. 30, 2022

(54) CAPACITIVE-COUPLING ELECTRONIC PEN

(71) Applicant: Wacom Co., Ltd., Saitama (JP)

(72) Inventors: Kenichi Ninomiya, Saitama (JP); Kohei Tanaka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/354,953

(22) Filed: Jun. 22, 2021

(65) Prior Publication Data

US 2021/0318766 A1    Oct. 14, 2021

Related U.S. Application Data

(63) Continuation of application No. PCT/JP2019/043891, filed on Nov. 8, 2019.

(30) Foreign Application Priority Data

Jan. 17, 2019  (JP) .............................. JP2019-006246

(51) Int. Cl.
*G06F 3/0354*    (2013.01)
*G06F 3/044*    (2006.01)
(Continued)

(52) U.S. Cl.
CPC ........ *G06F 3/03545* (2013.01); *G06F 3/0383* (2013.01); *G06F 3/0442* (2019.05); *G06F 3/04162* (2019.05); *G06F 3/04164* (2019.05)

(58) Field of Classification Search
CPC .............. G06F 3/03545; G06F 3/0383; G06F 3/04162; G06F 3/04164; G06F 3/0442; G06F 3/044
See application file for complete search history.

(56) References Cited

U.S. PATENT DOCUMENTS

| 4,883,926 A | * | 11/1989 | Baldwin | ................. G06F 3/038 362/118 |
| 6,727,439 B2 | * | 4/2004 | Chao | ....................... B43K 8/22 178/19.01 |

(Continued)

FOREIGN PATENT DOCUMENTS

| JP | 2013-161307 A | 8/2013 |
| JP | 2016-12333 A | 1/2016 |

(Continued)

OTHER PUBLICATIONS

International Search Report, dated Dec. 10, 2019, for International Application No. PCT/JP2019/043891, 5 pages (with English language translation).

*Primary Examiner* — Benyam Ketema
(74) *Attorney, Agent, or Firm* — Seed IP Law Group LLP

(57) ABSTRACT

A capacitive-coupling electronic pen includes a tubular housing, a signal transmission circuit arranged in the housing, a tubular conductor fixed and arranged at a predetermined position in the housing, a conductive core body including a front end protruding from an opening on one side of the housing in an axial direction and an opposite end opposite the front end that is inserted into a hollow portion of the tubular conductor such that the opposite end is movable, and a connection member that electrically connects the signal transmission circuit and the tubular conductor. A signal from the signal transmission circuit is transmitted to the core body through capacitive coupling between the tubular conductor and the core body and transmitted to an outside of the electronic pen from a tip portion of the core body when the tubular conductor and the core body are not in contact with each other.

14 Claims, 8 Drawing Sheets

(51) Int. Cl.
    *G06F 3/041* (2006.01)
    *G06F 3/038* (2013.01)

(56) References Cited

U.S. PATENT DOCUMENTS

| | | | | |
|---|---|---|---|---|
| 8,878,824 | B2* | 11/2014 | Besperstov | G06F 3/03545 |
| | | | | 345/179 |
| 9,239,639 | B1* | 1/2016 | Vanderet | G06F 3/03545 |
| 9,269,488 | B2* | 2/2016 | Obata | G01B 7/003 |
| 9,582,093 | B2* | 2/2017 | Vandermeijden | G06F 3/044 |
| 9,702,778 | B2* | 7/2017 | Horie | G01D 5/2046 |
| 10,048,778 | B2* | 8/2018 | Mishalov | G06F 3/033 |
| 10,423,246 | B2* | 9/2019 | Kim | G06F 3/038 |
| 2001/0038384 | A1* | 11/2001 | Fukushima | H01G 5/014 |
| | | | | 345/179 |
| 2008/0257613 | A1* | 10/2008 | Katsurahira | G06F 3/03545 |
| | | | | 178/19.04 |
| 2009/0114459 | A1* | 5/2009 | Fukushima | G06F 3/03545 |
| | | | | 178/19.03 |
| 2010/0038152 | A1* | 2/2010 | Kaneda | G06F 3/03545 |
| | | | | 178/18.07 |
| 2011/0241703 | A1* | 10/2011 | Fukushima | G06F 3/03545 |
| | | | | 324/661 |
| 2013/0199311 | A1* | 8/2013 | Horie | G06F 3/046 |
| | | | | 73/862.626 |
| 2014/0069532 | A1* | 3/2014 | Obata | G06F 3/046 |
| | | | | 137/554 |
| 2015/0035807 | A1* | 2/2015 | Ito | G06F 3/03545 |
| | | | | 345/179 |
| 2015/0070330 | A1* | 3/2015 | Stern | G06F 3/0442 |
| | | | | 345/179 |
| 2015/0378456 | A1 | 12/2015 | Ho et al. | |
| 2016/0018912 | A1* | 1/2016 | Kaneda | G06F 3/033 |
| | | | | 345/179 |
| 2016/0188016 | A1 | 6/2016 | Munakata et al. | |
| 2016/0334894 | A1* | 11/2016 | Fujitsuka | G06F 3/0442 |
| 2017/0068342 | A1* | 3/2017 | Zimmerman | G06F 3/03545 |
| 2017/0371434 | A1* | 12/2017 | Kobori | G06F 3/0383 |
| 2018/0164908 | A1* | 6/2018 | Tanaka | G06F 3/03545 |
| 2018/0364821 | A1* | 12/2018 | Kaneda | G06F 3/03545 |
| 2019/0056806 | A1* | 2/2019 | Yeh | G06F 3/0383 |
| 2019/0179434 | A1* | 6/2019 | Tanaka | G06F 3/046 |
| 2020/0033958 | A1* | 1/2020 | Yamamoto | G06F 3/0442 |
| 2021/0247858 | A1* | 8/2021 | Hashimoto | G06F 3/038 |
| 2021/0263613 | A1* | 8/2021 | Hashimoto | G06F 3/03545 |
| 2021/0318766 | A1* | 10/2021 | Ninomiya | G06F 3/04164 |
| 2021/0405786 | A1* | 12/2021 | Kaneda | B43K 19/18 |

FOREIGN PATENT DOCUMENTS

| | | |
|---|---|---|
| JP | 2016-126503 A | 7/2016 |
| JP | 2016-149153 A | 8/2016 |
| JP | 2018-206093 A | 12/2018 |
| JP | 2018/225358 | 12/2018 |

\* cited by examiner

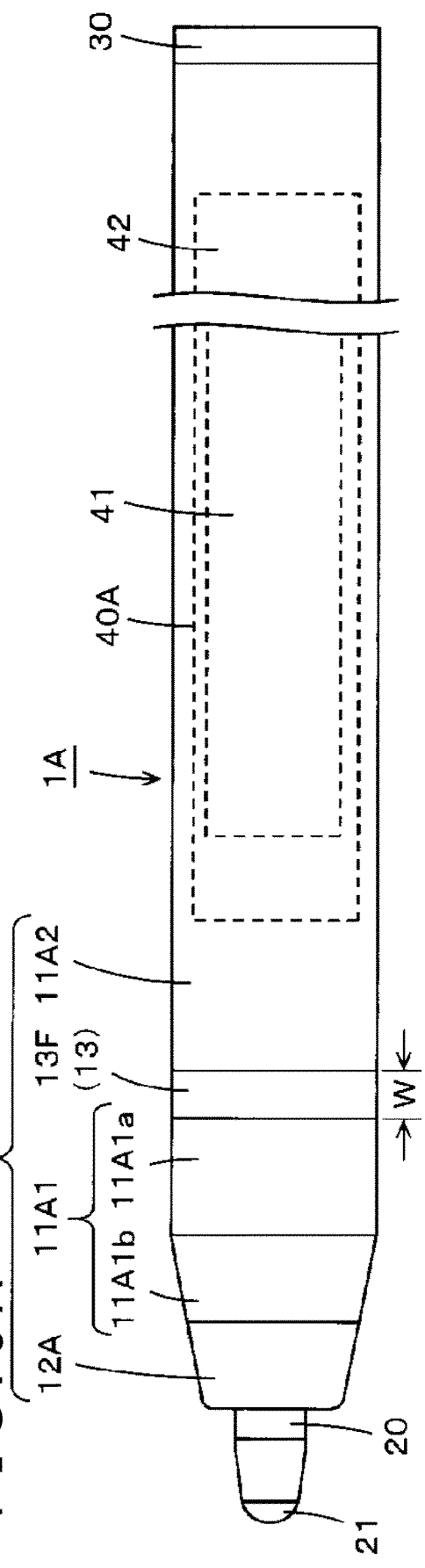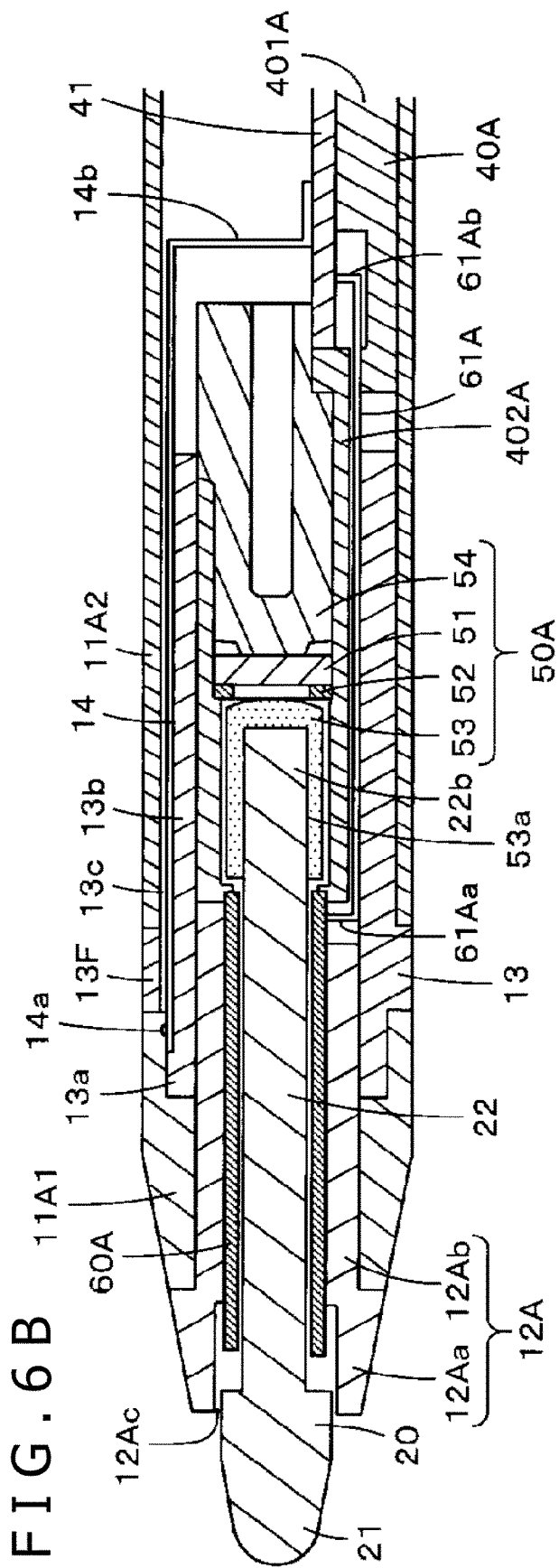

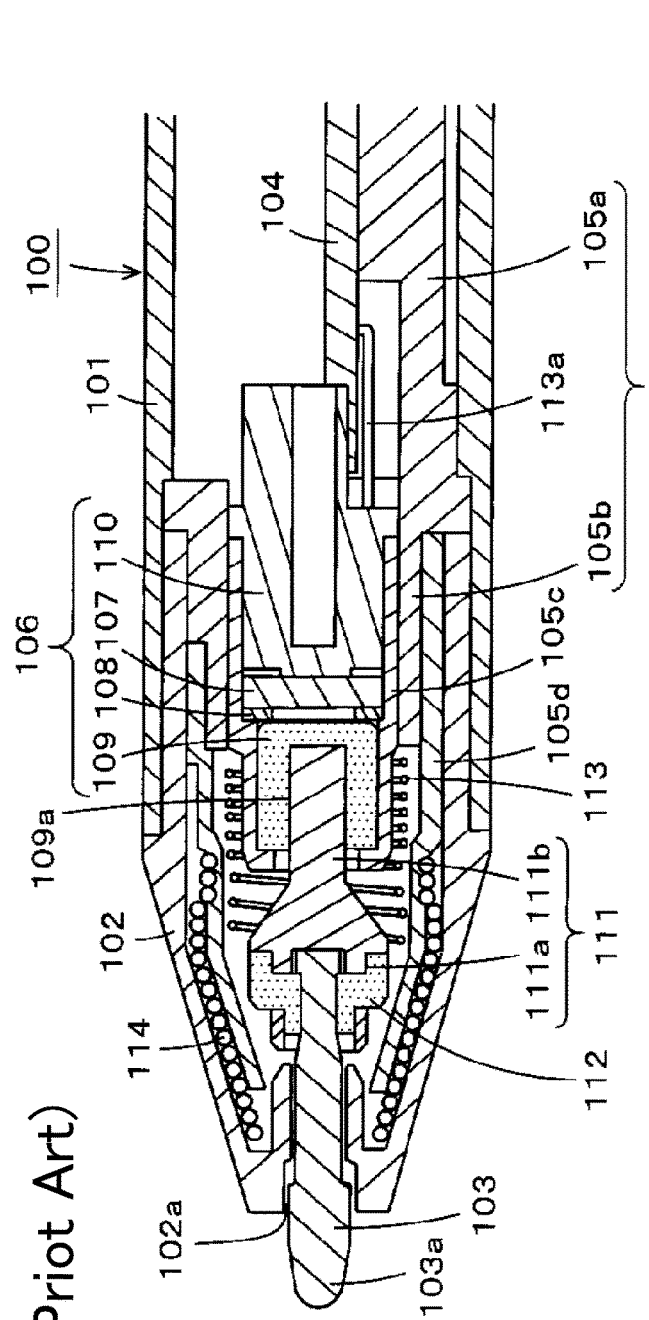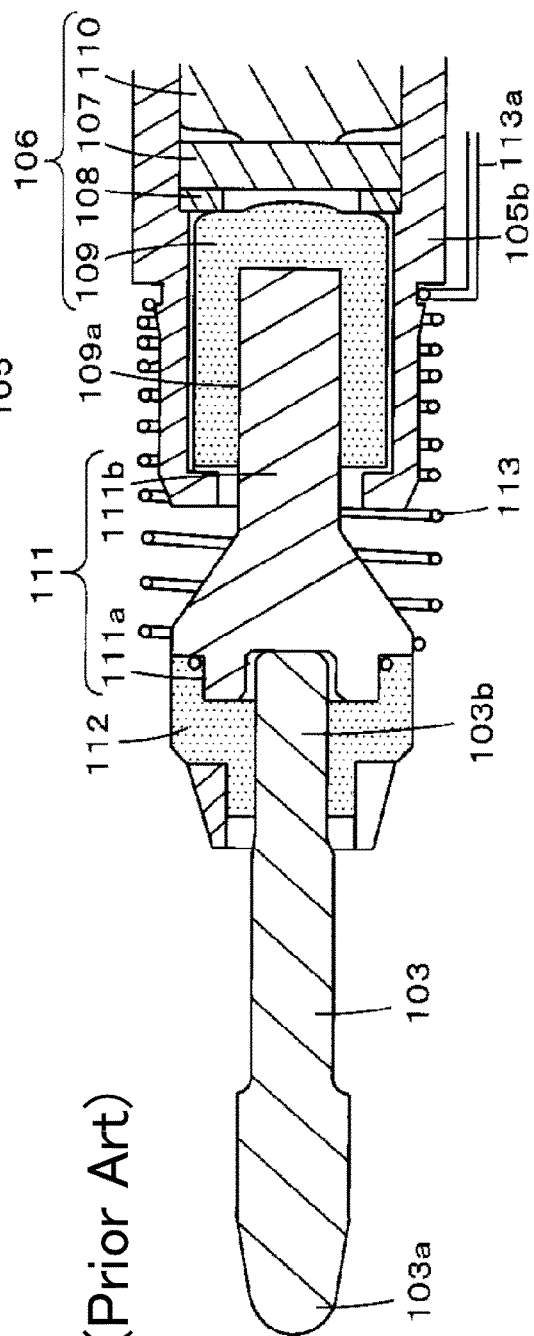
FIG. 9A (Prior Art)
FIG. 9B (Prior Art)

CAPACITIVE-COUPLING ELECTRONIC PEN

BACKGROUND

Technical Field

The present disclosure relates to a capacitive-coupling electronic pen.

Background Art

An example of a prized capacitive-coupling electronic pen includes what is generally called an active capacitive-coupling electronic pen that performs a transfer (interaction) of a signal through capacitive coupling to a position detection sensor of a position detection apparatus. The position detection sensor is used to detect a position instructed by the electronic pen.

This type of capacitive-coupling electronic pen includes, in a hollow portion of a tubular housing, a battery (primary battery or secondary battery) as a power supply, a pen pressure detector, a circuit board on which a signal transmission circuit is mounted, and the like. The components are lined up and housed in an axial direction of the housing of the electronic pen (see, for example, Japanese Patent Laid-Open No. 2016-126503).

In this case, the circuit board is mounted on a board holder, and the pen pressure detector includes pressure sensing components and pressure transmission members housed in a housing for pen pressure detector. The pen pressure detector and the board holder are often coupled in the axial direction of the housing of the electronic pen to form a unit (form a module). The board holder includes a housing part for pen pressure detector in some cases.

FIGS. 9A and 9B illustrate an example of a configuration on a pen tip side of this type of existing capacitive-coupling electronic pen. FIG. 9A illustrates a longitudinal cross-sectional view of the electronic pen. FIG. 9B is an enlarged explanatory view of the part where the board holder includes the housing part for pen pressure detector and forms a unit.

An electronic pen 100 of this example includes a front cap 102 including a tapered tubular body, the front cap 102 fitted and attached to an opening on the pen tip side of a tubular housing 101 as illustrated in FIG. 9A. The housing 101 is made of a conductive material, such as metal, so that the housing 101 is earthed (grounded) through the human body when the user holds and operates the electronic pen 100. The front cap 102 is made of an insulating material, such as a resin.

As illustrated in FIG. 9A, a core body 103 made of a conductive material is provided on the pen tip side such that the core body 103 can be inserted and freely moved in the axial direction, and the core body 103 is held by a core body holder 111. The core body 103 made of a conductive material and the housing 101 made of a conductive material are electrically separated (insulated) through the front cap 102.

As illustrated in FIG. 9A, a board holder 105 for placing, on a board mounting table portion 105a, a printed circuit board 104 provided with circuit components, such as a signal transmission circuit, is housed in a hollow portion of the housing 101.

The board holder 105 includes a tubular portion 105b that holds a tubular pressure sensing component holding portion 105c, on the pen tip side with respect to the board mounting table portion 105a. Pressure sensing components included in a pen pressure detector 106 are housed in the pressure sensing component holding portion 105c. The pen pressure detector 106 of this example includes a variable capacitor in which the capacitance changes according to the pen pressure applied to the core body 103.

The pressure sensing components of this example include a plurality of components including a dielectric 107, a spacer member 108 made of an insulating material, a conductive elastic member 109, and an engagement member 110 as illustrated in FIGS. 9A and 9B. The dielectric 107 has a disk shape, and although not illustrated, an electrode included in a first electrode of the variable capacitor is formed on one end surface on the engagement member 110 side in the axial direction of the disk shape.

The spacer member 108 is an insulating, elastic, ring-shaped member. The conductive elastic member 109 is made of, for example, conductive rubber, and a tip end surface of the conductive elastic member 109 is arranged to face an end surface on the other side of the dielectric 107, thereby providing a second electrode of the variable capacitor.

The engagement member 110 is arranged on the side provided with an electrode of the dielectric 107, and the engagement member 110 prevents the dielectric 107 from moving toward the back end in the axial direction.

In this example, the conductive elastic member 109 includes a fitting recessed portion 109a to which the core body holder 111 is fitted.

The core body holder 111 is made of a conductive material. A recessed hole 111a for housing a core body holding member 112 made of conductive elastic rubber and a rod-like portion 111b fitted to the pen pressure detector 106 are integrated to form the core body holder 111.

An end portion 103b on the opposite side of a tip portion 103a of the core body 103 is fitted to the conductive core body holding member 112 housed in the core body holder 111 made of a conductive material, and the core body 103 is coupled to and held by the core body holder 111 such that the core body 103 can be inserted and removed. The core body 103 and the core body holder 111 are displaced together in the axial direction according to the pressure applied to the tip portion 103a of the core body 103, and the pressure (pen pressure) applied to the tip portion 103a of the core body 103 is transmitted to the pen pressure detector 106.

A coil spring 113 that always biases the core body holder 111 toward the core body 103 is provided between the core body holder 111 and the tubular portion 105b of the board holder 105. The coil spring 113 is made of a conductive material, such as conductive metal. One end 113a of the coil spring 113 is extended to the printed circuit board 104 as illustrated in FIG. 9A and is electrically connected to the signal transmission circuit arranged on the printed circuit board 104.

The core body holder 111 is made of a conductive material. Therefore, the core body 103 made of a conductive material installed on the core body holder 111 through the conductive core body holding member 112 is electrically connected to the signal transmission circuit arranged on the printed circuit board 104 through the coil spring 113. In this way, a signal from the signal transmission circuit, which is a signal with a predetermined frequency f1 in this example, is transmitted to the position detection sensor through the core body 103.

In the electronic pen 100 of this example, the core body 103 is displaced inside of the housing 101 of the electronic pen 100 in the axial direction when pressure (pen pressure) is applied to the front end side of the core body 103. Consequently, the core body holder 111 provided with the core body 103 is displaced together with the core body 103 in the axial direction, and the conductive elastic member 109 of the pen pressure detector 106 is displaced toward the dielectric 107. The contact area of the conductive elastic member 109 and the dielectric 107 changes according to the applied pressure, and the capacitance of the variable capacitor including the pen pressure detector 106 changes according to the applied pressure. Therefore, the pen pressure can be detected from the capacitance of the variable capacitor including the pen pressure detector 106.

In the electronic pen 100 of this example, a peripheral electrode 114 made of a conductive material surrounding the core body 103 is provided as illustrated in FIG. 9A. The peripheral electrode 114 is electrically connected to the circuit components of the printed circuit board 104, although not illustrated in FIG. 9A. The peripheral electrode 114 is used to transmit a signal from the signal transmission circuit to the position detection sensor to detect the tilt of the electronic pen 100 or to receive an indication signal transmitted from the position detection apparatus through the position detection sensor.

In the electronic pen 100 of this example, a tubular insulating member 105d for ensuring the insulation between the set of core body 103 and core body holder 111 and the peripheral electrode 114 is fitted to a peripheral portion of the tubular portion 105b of the board holder 105.

As illustrated in FIG. 9A, a tubular portion 102c pierced through the core body 103 is provided inside and near an opening 102a of the front cap 102, and the peripheral electrode 114 is also electrically separated (insulated) from the core body 103 due to the existence of the tubular portion 102c. The front cap 102 also plays a role of electrically separating (insulating) the peripheral electrode 114 and the housing 101 of the electronic pen 100 as illustrated in FIG. 9A.

As described above, in the existing capacitive-coupling electronic pen 100, the conductive core body 103 and the signal transmission circuit provided on the printed circuit board 104 are electrically connected by fitting the core body 103 to the core body holder 111 made of a conductive material and using the coil spring 113 made of a conductive material electrically connected to the core body holder 111.

This is because the core body 103 can be inserted into and removed from the electronic pen, and the pen pressure displaces the core body 103 in the axial direction so that direct and electrical connection of the core body 103 and the signal transmission circuit is difficult. The coil spring 113 is used to prevent poor electrical connection caused by the displacement and to ensure the electrical connection of the core body and the signal generation circuit even if the core body 103 is displaced together with the core body holder 111 in the axial direction according to the pen pressure applied to the tip portion 103a.

In this way, the conductive core body holder 111 needs to be used, and the coil spring 113 needs to ensure the electrical connection of the core body 103 and the signal generation circuit in the existing electronic pen. There is a problem that it is difficult to reduce the thickness of the electronic pen due to the existence of the core body holder 111 and the coil spring 113.

There is also a problem that the coil spring 113 adversely affects the detected pen pressure when the pen pressure detector 106 detects the pen pressure applied to the tip portion 103a of the core body 103. More specifically, even if the pen pressure detector is adjusted to provide uniform transmission characteristics with respect to the load, and the adjusted pen pressure detector is provided as the pen pressure detector 106, there are variations in the coil spring 113 if there are variations in the transmission characteristics with respect to the load in the coil spring 113. There is a problem that the transmission characteristics with respect to the load vary in the pen pressure detection of the electronic pen 100.

BRIEF SUMMARY

In view of the problems, an object of the present disclosure is to provide a capacitive-coupling electronic pen that can supply a signal to a conductive core body without using an elastic member even when the electronic pen has a pen pressure detection function.

To solve the problems, provided is a capacitive-coupling electronic pen including: a tubular housing; a signal transmission circuit arranged in the housing; a tubular conductor fixed and arranged at a predetermined position in the housing such that an axial direction of the tubular conductor corresponds to an axial direction of the housing; a conductive core body including a front end protruding from an opening on one side of the housing in the axial direction of the housing, and an opposite end that is opposite the front end and that is inserted into a hollow portion of the tubular conductor such that the opposite end is movable; and a connection member that electrically connects the signal transmission circuit and the tubular conductor. A signal from the signal transmission circuit is transmitted to the core body through capacitive coupling between the tubular conductor and the core body and transmitted to an outside of the electronic pen from a tip portion of the core body when the tubular conductor electrically connected to the signal transmission circuit and the core body are not in contact with each other.

In the electronic pen configured as described above, the tubular conductor is fixed and arranged at the predetermined position in the housing, and the opposite end of the conductive core body that is opposite the front end of the conductive core body is inserted into the hollow portion of the tubular conductor such that the opposite end is movable. The signal transmission circuit and the tubular conductor are electrically connected through the connection member.

Both the core body and the tubular conductor are conductors. Therefore, if the core body and the tubular conductor are in contact with each other, the signal from the signal transmission circuit is supplied to the core body through the connection member and the tubular conductor and sent out to the position detection sensor from the front end of the core body.

When the core body and the tubular conductor are not in contact with each other, the signal from the signal transmission circuit is transmitted through the connection member to the core body through the capacitive coupling between the tubular conductor and the core body and is transmitted to the outside from the tip portion of the core body.

In this way, the electronic pen is configured to supply the signal of the signal transmission circuit to the core body through the tubular conductor fixed and arranged at the predetermined position in the housing. Therefore, core body holder and a coil spring made of a conductive material do not have to be provided to supply the signal from the signal transmission circuit to the core body unlike in the electronic pen described at the beginning, and it is only necessary to arrange, at the fixed position in the housing, the tubular conductor into which the core body is inserted. Therefore, there is an advantageous effect that the thickness of the electronic pen can be reduced. The conductive coil spring is not necessary, and this can prevent the variations in transmission characteristics with respect to the load of the pen pressure detector after adjustment even when the pen pressure detector is provided on the electronic pen.

BRIEF DESCRIPTION OF THE DRAWINGS

FIGS. 6A and 6B are diagrams for describing a configuration example of a capacitive-coupling electronic pen according to a second embodiment of the present disclosure;

FIGS. 9A and 9B are diagrams for describing an example of an existing capacitive-coupling electronic pen.

DETAILED DESCRIPTION

Some embodiments of an electronic pen according to the present disclosure will now be described with reference to the drawings.

First Embodiment

Figure 1A:
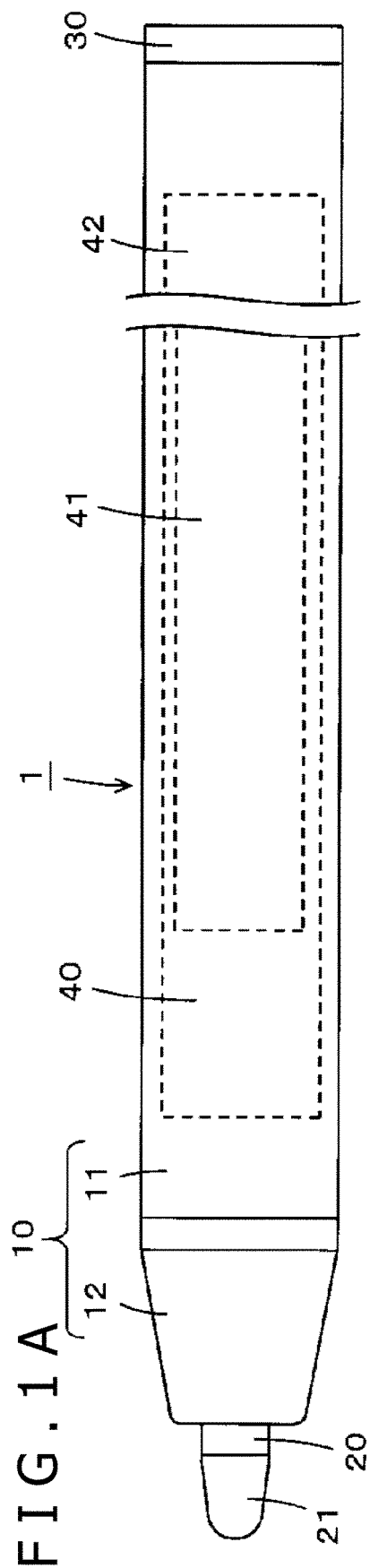
FIGS. 1A and 1B are diagrams for describing a configuration example of a capacitive-coupling electronic pen according to a first embodiment of the present disclosure.
Figure 1B:
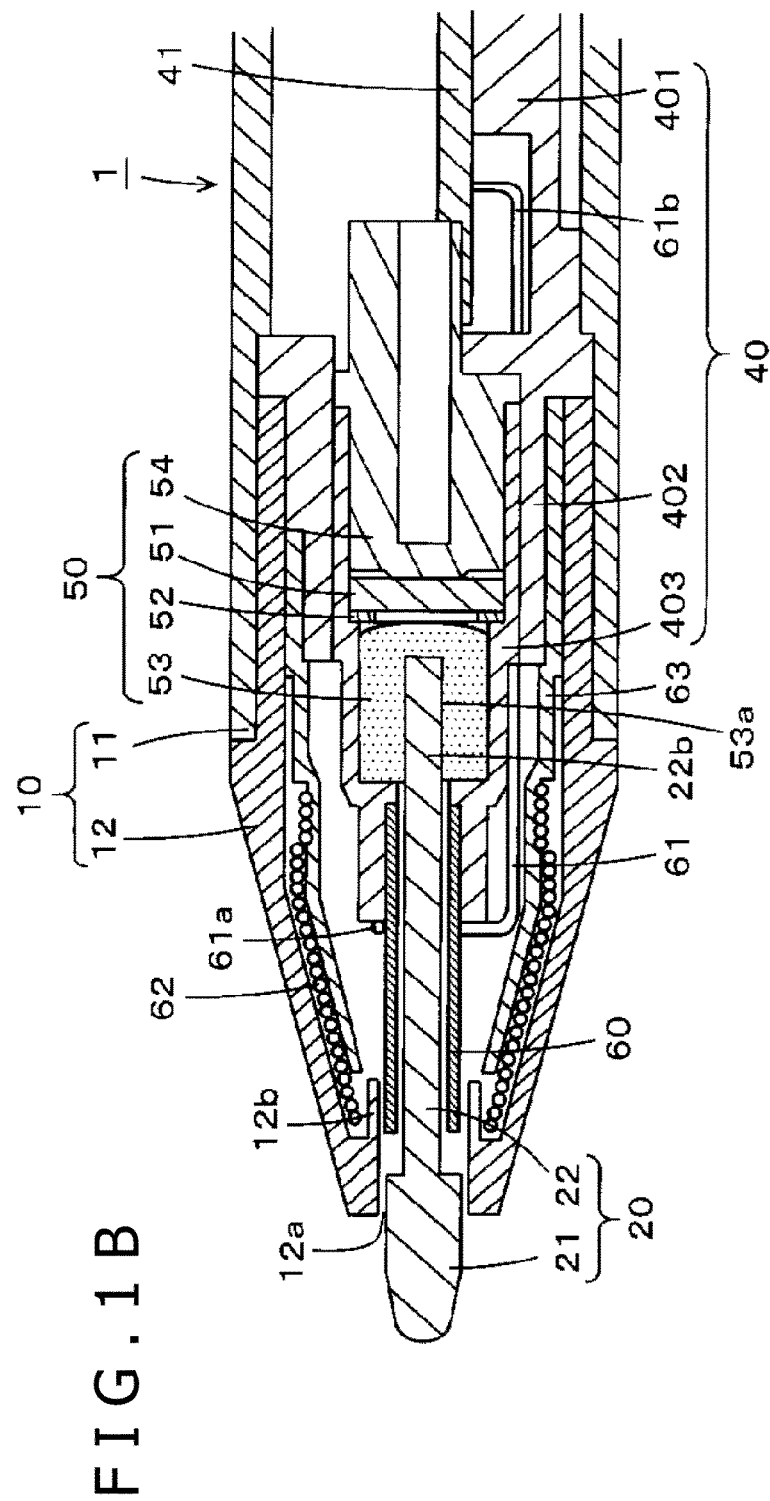

FIGS. 1A and 1B are diagrams for describing a configuration example of a capacitive-coupling electronic pen according to a first embodiment the present disclosure. FIG. 1A depicts an appearance of a capacitive-coupling electronic pen 1 of this embodiment, and FIG. 1B is a longitudinal cross-sectional view for describing a configuration of main parts of the electronic pen 1.

A housing 10 of the electronic pen 1 of this embodiment includes a front cap 12, which includes a tubular body in a cone shape, fitted and attached to an opening on the pen tip side of a tubular (cylindrical in this example) housing body portion 11 as illustrated in FIGS. 1A and 1B. The housing 10 is not limited to the cylindrical shape, and the housing 10 may have a tubular shape with a polygonal cross section.

The housing body portion 11 is made of a conductive material, such as metal, so that the housing body portion 11 is earthed (grounded) through the human body when the user holds and operates the electronic pen 1. The front cap 12 is made of an insulating material, such as a resin. As illustrated in FIG. 1B, an opening 12a is provided on the tapered pen tip side of the front cap 12, the opening 12a enables a core body 20 to be inserted so that the core body 20 can freely move in the axial direction.

The core body 20 is made of a conductive material, such as metal, and the cross section in a direction orthogonal to the axial direction is circular in this example. As illustrated in FIG. 1B, the core body 20 includes a tip portion 21 and a core main body portion 22. The core body 20 is inserted into the housing 10 of the electronic pen 1 from an end portion 22b side of the core main body portion 22, from the opening 12a of the front cap 12. Part or all of the tip portion 21 of the core body 20 protrudes outside from the opening 12a of the front cap 12. In this case, the conductive core body 20 and the housing body portion 11 made of a conductive material are electrically separated (insulated) through the front cap 12 placed between the core body 20 and the housing body portion 11.

A board holder 40, which is provided with a printed circuit board 41 mounted on a board mounting table portion 401, and a battery 42 as a power supply are housed in a hollow portion of the housing body portion 11 as illustrated in FIGS. 1A and 1B. The battery 42 may be a primary battery or may be a secondary battery (rechargeable battery). The opposite side of the pen tip side of the housing body portion 11 (hereinafter, the opposite side of the pen tip side of the housing body portion 11 will be referred to as a back end side) is blocked by a back cap 30 as illustrated in FIG. 1A.

The configuration of the board holder 40 is similar to the configuration of the board holder 105 of the electronic pen 100 described with reference to FIGS. 9A and 9B. The board holder 40 is made of an insulating resin and includes the board mounting table portion 401 and a tubular portion 402 on the pen tip side of the board mounting table portion 401 in the longitudinal direction that is the axial direction of the electronic pen 1. The board holder 40 is arranged such that the board holder 40 cannot move in the axial direction in the housing 10. In the tubular portion 402, the board holder 40 includes a pressure sensing component holding portion 403 that holds pressure sensing components included in a pen pressure detector 50, as in the tubular portion 105b of the board holder 105 of the electronic pen 100.

The configuration of the pressure sensing components in this example held in the pressure sensing component holding portion 403 is similar to the configuration described with reference to FIGS. 9A and 9B. The pressure sensing components include a plurality of components including a dielectric 51, a spacer member 52, a conductive elastic member 53, and an engagement member 54. The dielectric 51 corresponds to the dielectric 107 in FIGS. 9A and 9B. The spacer member 52 corresponds to the spacer member 108 in FIGS. 9A and 9B. The conductive elastic member 53 corresponds to the conductive elastic member 109 in FIGS. 9A and 9B. The engagement member 54 corresponds to the engagement member 110 in FIGS. 9A and 9B. The detailed configuration and operation of the pen pressure detector 50 are similar to those described for the pen pressure detector 106 in FIGS. 9A and 9B, and the description will not be repeated here.

In this example, the pen pressure detector 50 and the board mounting table portion 401 are also arranged in the axial direction in the board holder 40 to provide unit (module) components. The core body 20 is fitted and attached to the pen pressure detector 50 included in the unit components so that the core body 20 transmits the pen pressure. A signal is supplied to the conductive core body 20 from the signal transmission circuit arranged on the printed circuit board 41 provided in the board holder 40 as described below.

In the electronic pen 1 of this embodiment, the core body 20 and an output end of the signal transmission circuit on the printed circuit board 41 are electrically connected without using a coil spring.

Figure 2:
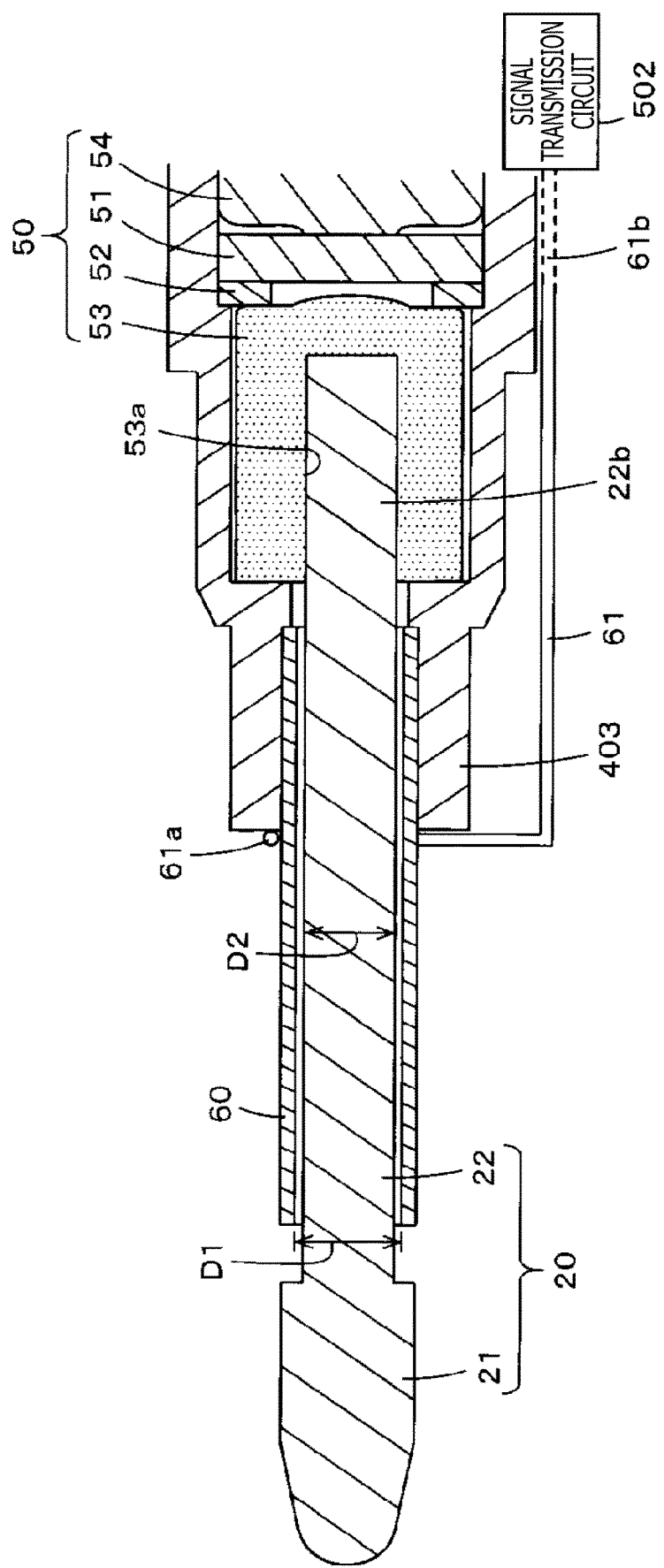
FIG. 2 is a diagram for describing a configuration example of parts in the capacitive-coupling electronic pen according to the first embodiment of the present disclosure.

FIG. 2 is an enlarged explanatory view of a part where the board holder 40 includes the housing part of the pen pressure detector 50 and forms a unit. The configuration of main parts in this embodiment will be described with reference to FIGS. 1B and 2.

In the electronic pen 1 of this embodiment, a tubular conductor 60 in a cylindrical shape in this example is fixed and held on the pen tip side in the axial direction of the tubular pressure sensing component holding portion 403 such that the axial direction of the tubular conductor 60 coincides with the axial direction of the housing 10. The tubular conductor 60 is made of conductive metal, such as stainless steel (SUS), in this example. The tubular conductor 60 has an inner diameter D1 larger than an outer diameter D2 of the core main body portion 22 of the core body 20 as illustrated in FIG. 2. In this embodiment, the length in the axial direction of the tubular conductor 60 is a length such that the tubular conductor 60 is extended to near the opening 12a of the front cap 12 without protruding outside from the opening 12a. As illustrated in FIG. 1B, the length in the axial direction of the tubular conductor 60 in this example is a length such that an inner wall surface of a tubular portion 12b formed inside of the opening 12a of the front cap 12 and a peripheral side surface on the pen tip side of the tubular conductor 60 face each other, and a length shorter than the length in the axial direction of the core main body portion 22 of the core body 20 is selected.

As illustrated in FIGS. 1B and 2, one end 61a of a connection wire 61 made of a conductive material is, for example, soldered and attached to a part exposed to the outside in the peripheral side surface part of the tubular conductor 60. The connection wire 61 is guided along the outer surface of the pressure sensing component holding portion 403 and led toward the board mounting table portion 401. Another end 61b of the connection wire 61 led toward the board mounting table portion 401 is electrically connected to a signal output end of the signal transmission circuit (not illustrated in FIGS. 1A and 1B) of the printed circuit board 41.

As illustrated in FIGS. 1B and 2, the core main body portion 22 of the core body 20 is inserted into a hollow portion of the tubular conductor 60, and the end portion 22b of the core main body portion 22 is fitted in a fitting recessed portion 53a provided on the conductive elastic member 53 of the pen pressure detector 50 such that the end portion 22b can be inserted and removed. Therefore, in the electronic pen 1 of this embodiment, the end portion 22b of the core main body portion 22 of the core body 20 is directly fitted in the fitting recessed portion 53a provided on the conductive elastic member 53 of the pen pressure detector 50 without the involvement of the core body holder. In this case, the outer diameter of the core main body portion 22 of the core body 20 is smaller than the inner diameter of the tubular conductor 60, and therefore, the core main body portion 22 of the core body 20 and the inner wall surface of the hollow portion of the tubular conductor 60 are not in contact with each other.

However, the peripheral surface of the core main body portion 22 and the inner wall surface of the hollow portion of the tubular conductor 60 are capacitive-coupled through an air layer of a gap between the peripheral surface and the inner wall surface in this case. Therefore, a signal (alternating current (AC) signal) can be transferred between the peripheral surface of the core main body portion 22 and the inner wall surface of the hollow portion of the tubular conductor 60 through the capacitive coupling.

Note that the force in the direction orthogonal to the axial direction is also applied to the core body 20 when, for example, the electronic pen 1 is tilted with respect to the input surface of the position detection sensor, and the core main body portion 22 of the core body 20 may come in contact with the tubular conductor 60. The signal from the signal transmission circuit is transmitted through the contact part when the core main body portion 22 of the core body 20 and the inner wall surface of the hollow portion of the tubular conductor 60 are in contact with each other.

In the electronic pen 1 of this example, the core body 20 is displaced in the axial direction toward the direction of the housing body portion 11 of the electronic pen 1 when pressure (pen pressure) is applied to the tip portion 21 side of the core body 20. Therefore, the conductive elastic member 53 of the pressure sensing components in the pen pressure detector 50 provided with the end portion 22b of the core main body portion 22 in the core body 20 is displaced toward the dielectric 51. Consequently, the part of the conductive elastic member 53 corresponding to the hollow portion of the ring-shaped spacer member 52 is displaced to come in contact with the dielectric 51. The contact area of the conductive elastic member 53 and the dielectric 51 changes according to the applied pressure, and the capacitance of the variable capacitor including the pen pressure detector 50 changes according to the applied pressure. Therefore, the pen pressure can be detected from the capacitance of the variable capacitor including the pen pressure detector 50.

In the electronic pen 1 of this embodiment, a peripheral electrode 62 made of a conductive material is arranged in the front cap 12 so as to surround the part of the core main body portion 22 of the core body 20 inserted into the tubular conductor 60 as illustrated in FIG. 1B. In this example, a conductive metal wire is coiled to form the peripheral electrode 62. In this example, a tubular peripheral electrode holding portion 63 made of a resin of an insulating material is fitted to a peripheral portion on the pen tip side of the pressure sensing component holding portion 403 of the board holder 40. The peripheral electrode holding portion 63 has a tubular shape similar to the inner wall surface of the front cap 12 in order to form a space between the peripheral electrode holding portion 63 and the inner wall surface of the front cap 12. As illustrated in FIG. 1B, the peripheral electrode 62 is arranged in a space between the peripheral surface of the tubular peripheral electrode holding portion 63 and the inner wall surface of the front cap 12. The coil member included in the peripheral electrode 62 is electrically connected to the circuit components of the printed circuit board 41 through a connection member, although not illustrated in FIG. 1B.

In this example, the tubular portion 12b formed in the axial direction is formed in the hollow portion of the front cap 12 inside of the opening 12a. The peripheral electrode 62 is electrically separated (insulated) from the conductive core body 20 and the tubular conductor 60 through the peripheral electrode holding portion 63 and the tubular portion 12b.

[Configuration Example of Signal Processing Circuit of Electronic Pen 1]

Figure 3:
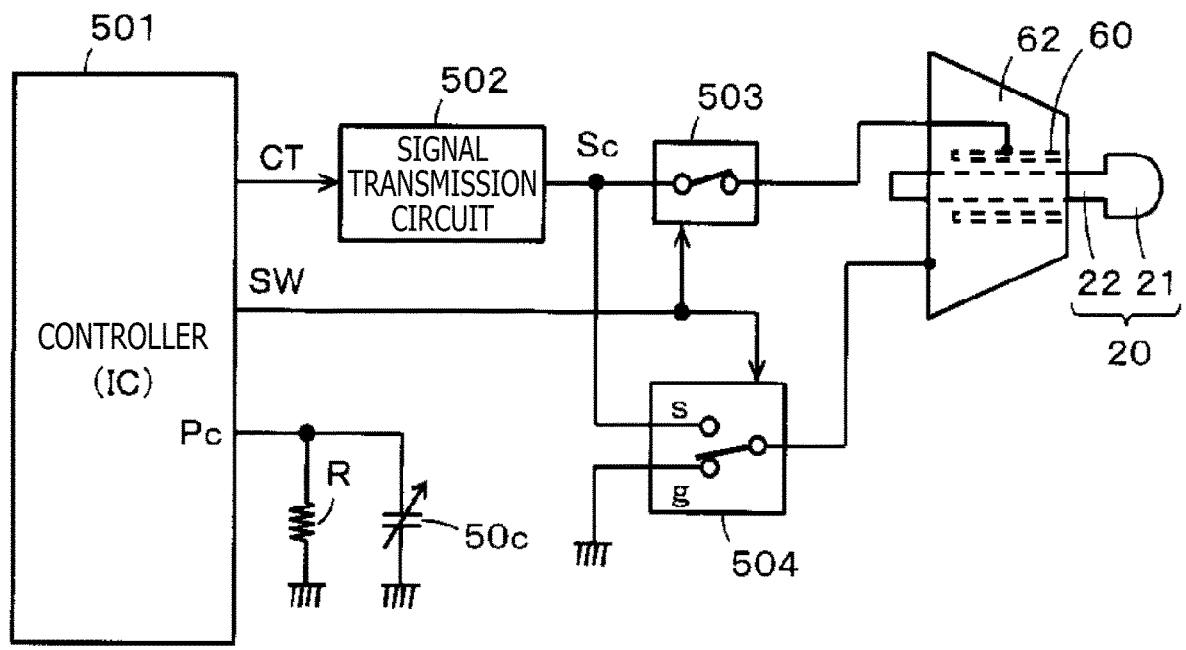
FIG. 3 is a block diagram for describing an example of a signal processing circuit in the capacitive-coupling electronic pen according to the first embodiment of the present disclosure.

FIG. 3 is a block diagram illustrating a configuration example of a signal processing circuit of the electronic pen 1 in this embodiment. It is obvious that electronic circuit components of the signal processing circuit are arranged on the printed circuit board 41. The signal processing circuit of the electronic pen 1 in this embodiment includes a controller 501, a signal transmission circuit 502, an open/close switch circuit 503, and a selector switch circuit 504 as illustrated in FIG. 3. A terminal Pc of the controller 501 is grounded through a parallel circuit of a variable capacitor 50C included in the pen pressure detector 50 and resistance R.

The controller 501 includes, for example, a microprocessor and provides a control circuit that controls the processing operation of the electronic pen 1. Although not illustrated in FIG. 3, a power supply voltage is supplied from the battery 42 as an example of a drive power supply to the controller 501. The controller 501 has a function of a signal supply control circuit and is configured to control the signal transmission circuit 502 and to control switching of the open/close switch circuit 503 and the selector switch circuit 504.

The controller 501 monitors the change in capacitance corresponding to the pen pressure applied to the tip portion 21 of the core body 20 of the variable capacitor 50C to thereby detect the pen pressure applied to the tip portion 21 of the core body 20 of the electronic pen 1. In this embodiment, the controller 501 detects the pen pressure from discharge time of the variable capacitor 50C with a capacitance value corresponding to the pen pressure applied to the tip portion 21 of the core body 20.

More specifically, to detect the pen pressure applied to the tip portion 21 of the core body 20, the controller 501 first sets the terminal Pc connected to one end of the variable capacitor 50C to a high −50C. The controller 501 then switches the terminal Pc to an input state for monitoring the voltage of the terminal Pc. In this case, the charge stored in the variable capacitor 50C is discharged with a discharge time constant determined by the resistance R connected in parallel to the variable capacitor 50C, and the voltage at both ends of the variable capacitor 50C gradually drops. The controller 501 obtains time Tp from the switch of the terminal Pc to the input state to the drop of the voltage at both ends of the variable capacitor 50C to a voltage equal to or lower than a predetermined threshold voltage. The time Tp corresponds to the pen pressure to be obtained, and the controller 501 obtains a pen pressure value of a plurality of bits from the time Tp.

The signal transmission circuit 502 includes an oscillation circuit that generates an AC signal with the predetermined frequency f1, such as frequency f1=1.8 MHz, in this embodiment. The controller 501 supplies a control signal CT to the oscillation circuit included in the signal transmission circuit 502 to perform on/off control of the oscillation circuit. Therefore, the oscillation circuit included in the signal transmission circuit 502 generates an intermittent AC signal according to the control signal CT from the controller 501, and in this way, the signal transmission circuit 502 generates a signal Sc including an amplitude shift keying (ASK) modulation signal. That is, the controller 501 controls the oscillation circuit included in the signal transmission circuit 502, and the signal transmission circuit 502 generates the ASK modulation signal. The signal generated by the signal transmission circuit 502 may be an on off keying (OOK) modulation signal, a frequency shift keying (FSK) modulation signal, or other modulation signals instead of the ASK modulation signal.

An amplifier not illustrated amplifies the signal Sc from the signal transmission circuit 502, and the signal Sc is supplied to the tubular conductor 60 through the open/close switch circuit 503 in this embodiment. The signal Sc supplied to the tubular conductor 60 is supplied to the core body 20 through the capacitance between the tubular conductor 60 and the core main body portion 22 of the core body 20 or through the contact part of the tubular conductor 60 and the core main body portion 22 of the core body 20, and the signal Sc is sent out from the tip portion 21.

The signal Sc from the signal transmission circuit 502 is also transmitted to one fixed terminal s of the selector switch circuit 504. Another terminal g of the selector switch circuit 504 is grounded. A movable terminal of the selector switch circuit 504 is connected to the peripheral electrode 62.

A switch control signal SW from the controller 501 controls on/off of the open/close switch circuit 503 and switches the selector switch circuit 504 between the terminal s and the terminal g.

Figure 4:
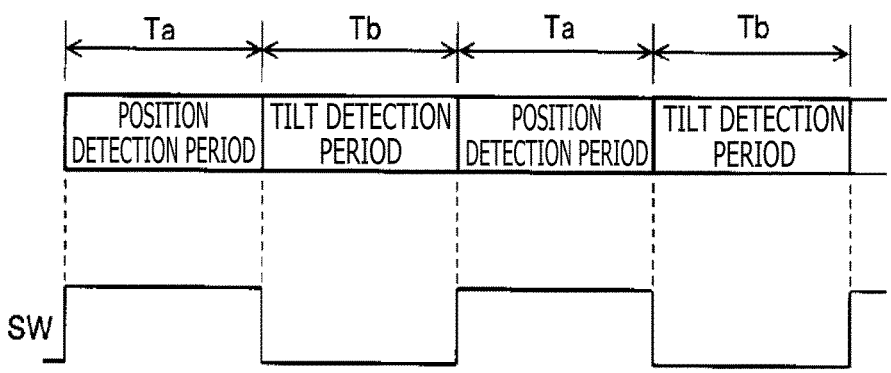
FIG. 4 depicts a timing chart for describing an example of the signal processing circuit in FIG. 3.

In the electronic pen 1 of this embodiment, the controller 501 controls the signal processing circuit to alternately execute a position detection period Ta and a tilt detection period Tb in time division as illustrated in the upper portion of FIG. 4. The switch control signal SW from the controller 501 switches and controls the open/close switch circuit 503 and the selector switch circuit 504 between the position detection period Ta and the tilt detection period Tb as illustrated in the lower portion of FIG. 4.

More specifically, in the signal processing circuit of the example in FIG. 3, the switch control signal SW from the controller 501 turns on the open/close switch circuit 503, and the output end of the signal transmission circuit 502 is connected to the tubular conductor 60 in the position detection period Ta. The selector switch circuit 504 is switched to the terminal g side, and the peripheral electrode 62 is grounded.

In the position detection period Ta, the control signal CT from the controller 501 controls the signal transmission circuit 502 to generate the signal Sc including a position detection signal and a signal of information of pen pressure. The position detection signal and the signal of information of pen pressure are supplied to the core body 20 through the tubular conductor 60 and sent out from the tip portion 21. The position detection signal is a continuous wave signal (burst signal) with the frequency f1. The signal of information of pen pressure is an ASK signal in which the signal with the frequency f1 is modulated based on the information of the pen pressure value of a plurality of bits detected and obtained by the controller 501 as described above. In this example, the position detection signal is sent out from the tip portion 21 of the core body 20 first, and then the signal of information of pen pressure is sent out from the tip portion 21 of the core body 20 in the position detection period Ta.

In the position detection period Ta, the peripheral electrode 62 is grounded, and the part of the core main body portion 22 in the core body 20 existing in the space covered by the peripheral electrode 62 is electrically shielded to prevent capacitive coupling of the part and the position detection sensor.

In the tilt detection period Tb, the switch control signal SW from the controller 501 turns off the open/close switch circuit 503, and the electrical connection of the output end of the signal transmission circuit 502 and the core body 20 is disconnected. The selector switch circuit 504 is switched to the terminal s side, and the output end of the signal transmission circuit 502 is connected to the peripheral electrode 62.

In the tilt detection period Tb, the control signal CT from the controller 501 controls the signal transmission circuit 502 to generate, as a tilt detection signal, a continuous wave signal (burst signal) with the frequency f1 similar to the position detection signal. Note that, in the tilt detection period Tb, the information of pen pressure (ASK signal) may also be generated after the tilt detection signal.

Therefore, the tilt detection signal is sent out to the position detection sensor through the peripheral electrode 62 in the tilt detection period Tb. The position detection apparatus detects the tilt angle of the electronic pen 1 from the detection signal obtained through the position detection sensor.

A method of detecting the tilt angle of the electronic pen 1 in the position detection apparatus will be described with reference to FIGS. 5A to 5F.

Figure 5A:
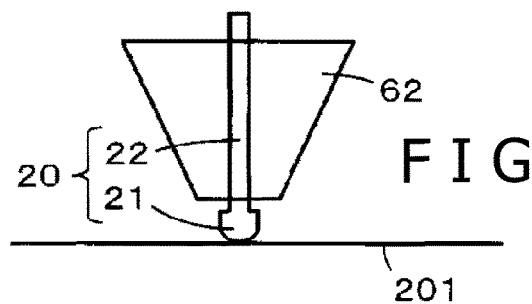
FIGS. 5A, 5B, 5C, 5D, 5E, and 5F are diagrams for describing an example of a function of a peripheral electrode in the capacitive-coupling electronic pen according to the first embodiment of the present disclosure.
Figure 5B:
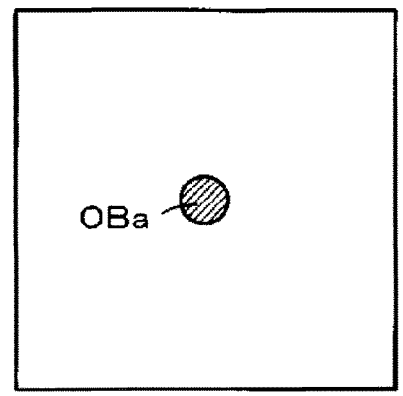
Figure 5C:
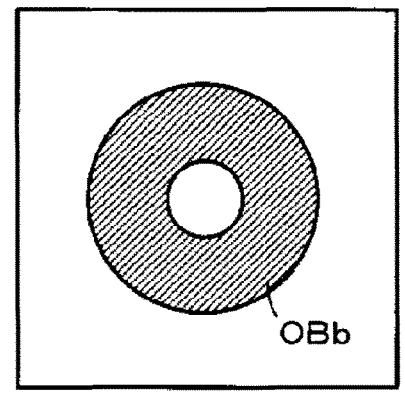

When the core body 20 of the electronic pen 1 is perpendicular to the input surface of a position detection sensor 201 as illustrated in a schematic diagram of FIG. 5A, the core body 20 and the position detection sensor 201 are capacitive-coupled in the position detection period Ta, and the capacitive-coupled region OBa is a region of perfect circle as illustrated in FIG. 5B. On the other hand, the peripheral electrode 62 and the position detection sensor 201 are capacitive-coupled in the tilt detection period Tb, and the capacitive-coupled region OBb is a ring-shaped region as illustrated in FIG. 5C.

Figure 5D:
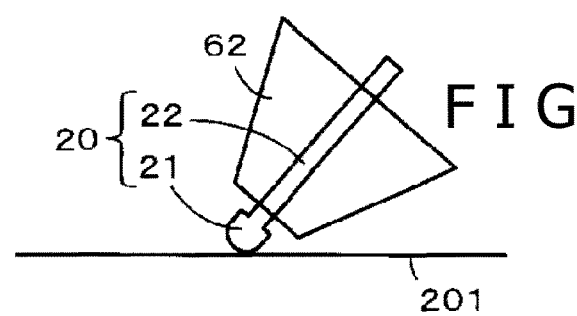
Figure 5E:
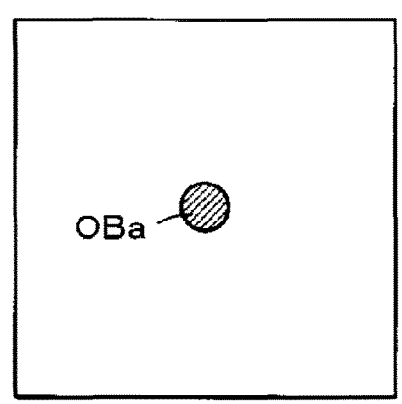

When the core body 20 of the electronic pen 1 is tilted with respect to the input surface of the position detection sensor 201 as illustrated in a schematic diagram of FIG. 5D, the capacitive-coupled region OBa between the core body 20 and the position detection sensor 201 in the position detection period Ta is still a region of substantially perfect circle as illustrated in FIG. 5E. On the other hand, the capacitive-coupled region OBb between the peripheral electrode 62 and the position detection sensor 201 in the tilt detection period Tb becomes an elliptical region corresponding to the tilt angle and elongated in the tilt direction as illustrated in FIG. 5F.

Figure 5F:
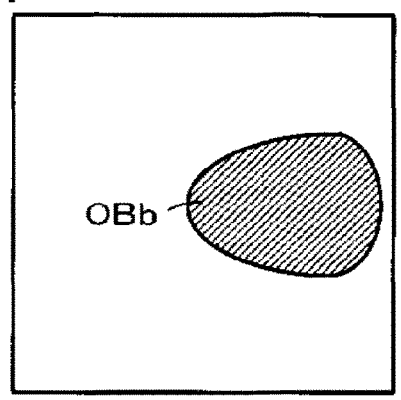

Therefore, the position detection apparatus can detect the size of the tilt angle of the electronic pen 1 from the length in the oblong direction of the elliptical shape of the region OBb illustrated in FIG. 5F. The position detection apparatus can also detect the oblong direction of the elliptical shape of the region OBb on the basis of the indicated position of the electronic pen 1 illustrated in FIG. 5E to thereby detect the direction of the tilt of the electronic pen 1.

Although the signal with the frequency f1 supplied to the core body 20 is used for the peripheral electrode 62 used to detect the tilt angle in the example of FIG. 3, the frequency of the signal supplied to the core body 20 and the frequency of the signal supplied to the peripheral electrode 62 may be different. In that case, the position detection apparatus can distinguish the signal from the core body 20 and the signal from the peripheral electrode 62. Therefore, instead of repeating the position detection period and the tilt detection period in time division as described above, the signal from the core body 20 and the signal from the peripheral electrode 62 may be sent out to the position detection sensor at the same time.

In the electronic pen 1 of the first embodiment described above, the tubular conductor 60 is fixed and arranged at a predetermined position in the housing 10 of the electronic pen 1, and the tubular conductor 60 is electrically connected to the signal transmission circuit 502 through the connection wire 61. The core main body portion 22 of the core body 20 is inserted into the tubular conductor 60 such that the core main body portion 22 can be inserted and removed. In this case, even if the core main body portion 22 of the core body 20 and the tubular conductor 60 are not in contact with each other, the signal (AC signal with frequency f1) from the signal transmission circuit 502 is transmitted to the core body 20 through the capacitive coupling between the tubular conductor 60 and the core main body portion 22 of the core body 20.

According to the electronic pen 1 of the first embodiment configured in this way, only the tubular conductor 60 and the connection wire 61 need to be used to supply the signal from the signal transmission circuit 502 to the core body 20, instead of using the core body holder including a conductor provided with a core body fitting portion, the coil spring, or other elastic members for connection as described at the beginning. Therefore, according to the electronic pen 1 of the embodiment, a large space for providing a core body holder or an elastic member for connection, such as a coil spring, is not necessary. The pen tip side of the electronic pen 1 can be thin, and the thickness of the electronic pen 1 can be easily reduced. Particularly, there is an advantageous effect that the housing 10 of the electronic pen 1 can be thin even if the peripheral electrode 62 arranged to cover around the core main body portion 22 of the core body 20 is provided as in this embodiment.

In the past, the part electrically connected to the signal transmission circuit has been a core body holder that is displaced along with the displacement of the core body in the axial direction. Therefore, an elastic member, such as a coil spring, that can absorb the displacement in the axial direction needs to be used as a connection member. However, in the electronic pen 1 of the first embodiment, the tubular conductor 60 and the connection wire 61 are used, in which the fixed state is maintained even when the core body 20 is displaced in the axial direction according to the pen pressure. Therefore, an elastic member does not have to be used as a connection member for the electrical connection to the signal transmission circuit. This can eliminate the influence of the elastic member, such as a coil spring, for electrical connection to the signal transmission circuit in the pen pressure detection of the pen pressure detector 50, and the variations in characteristics of the pen pressure detector 50 can be reduced. Particularly, if there is a coil spring as in the existing technique, there are variations in the pen pressure (called on-load) at the start of writing after the tip portion 21 of the core body 20 of the electronic pen 1 comes in contact with the input surface of the position detection sensor. The variations can be significantly reduced.

Second Embodiment

In active capacitive electronic pens of recent years, an electronic pen of two-way communication has emerged that receives a signal from a position detection sensor side, which detects an instruction position of the electronic pen, and that transmits a signal in a format based on a request of the received signal. The peripheral electrode is also used for receiving the signal from the position detection sensor side.

In the capacitive electronic pen, the signal transferred to and from the position detection sensor is based on an electric field that can be transmitted and received by capacitive coupling, and the travel distance is significantly short. Therefore, the peripheral electrode of the electronic pen is arranged at a position close to the pen tip to allow transferring the signal to and from the position detection sensor at high strength. In other words, the position and the size of the peripheral electrode are important in transmitting and receiving the signal to and from the position detection sensor.

In the electronic pen 1 of the first embodiment, the peripheral electrode 62 is provided in the front cap 12 to ensure the insulation from the housing body portion 11 made of a conductive material. The position and the size of the peripheral electrode are limited due to the space in the front cap 12.

An electronic pen 1A of a second embodiment described below is an example that can improve the problem. A configuration example of the electronic pen 1A of the second embodiment will be described with reference to FIGS. 6A, 6B, and 7.

Figure 7:
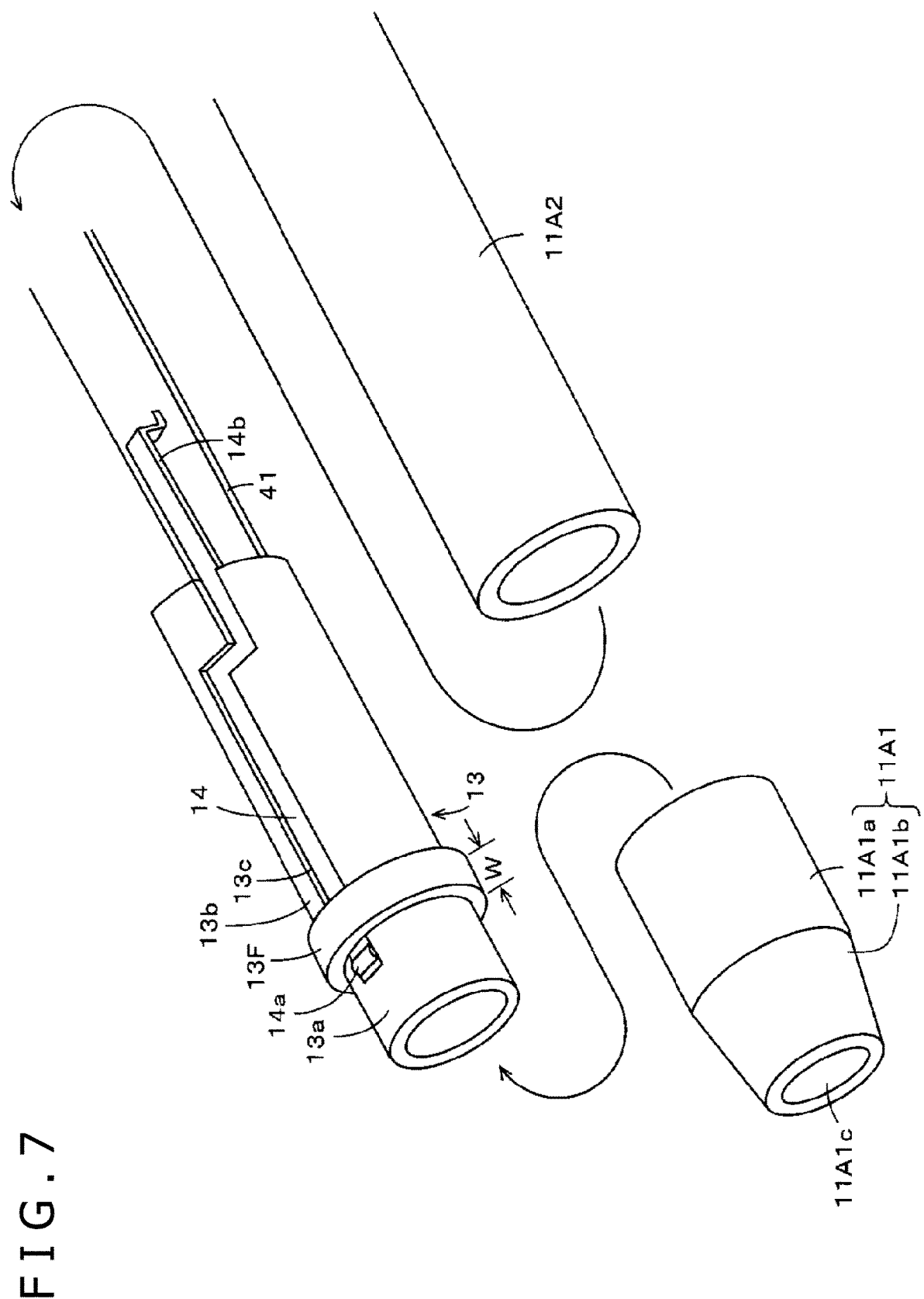
FIG. 7 is a diagram for describing a configuration example of a housing in the capacitive-coupling electronic pen according to the second embodiment of the present disclosure.

FIGS. 6A and 6B are diagrams for describing a configuration example of the capacitive-coupling electronic pen 1A according to the second embodiment of the present disclosure. FIG. 6A depicts an appearance of the capacitive-coupling electronic pen 1A of the second embodiment, and FIG. 6B depicts a longitudinal cross-sectional view of the pen tip side of the electronic pen 1A. FIG. 7 is an exploded perspective view for describing a configuration of a housing 10A of the capacitive electronic pen 1A in this embodiment. In FIGS. 6A, 6B, and 7, the same reference signs are provided to the same parts as the electronic pen 1 of the first embodiment, and the detailed description will not be repeated.

The housing 10A of the capacitive electronic pen 1A of this embodiment includes a front cap 12A attached to the pen tip side of a tubular (cylindrical in this example) housing body portion 11A as in the first embodiment. However, the configurations of the housing body portion 11A and the front cap 12A are different from the configurations of the housing body portion 11 and the front cap 12 of the first embodiment.

More specifically, in the electronic pen 1A of the second embodiment, the housing body portion 11A includes a first housing portion 11A1 on the pen tip side and a second housing portion 11A2 on the back end side that are coupled through a tubular coupling member 13. The front cap 12A is fitted from an opening 11A1c (see FIG. 7) on the first housing portion 11A1 side of the housing body portion 11A. The core body 20 is held in the housing 10A of the electronic pen 1A such that the tip portion 21 of the core body 20 protrudes outside from an opening 12Ac (see FIG. 6B) of the front cap 12A.

Each of the first housing portion 11A1 on the pen tip side and the second housing portion 11A2 on the back end side is made of a conductive material, such as conductive metal, and includes a tubular body as illustrated in FIGS. 6A, 6B, and 7.

The first housing portion 11A1 is shaped to include a cylindrical shape portion 11A1a with a constant outer diameter and a tapered portion 11A1b formed in a tapered shape gradually becoming narrower toward the pen tip side as illustrated in FIGS. 6A, 6B, and 7. The second housing portion 11A2 has a cylindrical shape with an outer diameter equal to the outer diameter of the cylindrical shape portion 11A1a of the first housing portion 11A1.

The tubular coupling member 13 is made of an insulating material, a resin in this example, and is a tubular body as illustrated in FIGS. 6B and 7. At a position close to the center in the axial direction of the peripheral surface of the tubular coupling member 13, a ring-shaped flange portion 13F protruding in the direction orthogonal to the axial direction from the peripheral side surface is formed. The ring-shaped flange portion 13F has a predetermined width W (see FIGS. 6A, 6B, and 7) in the axial direction. The end surface (peripheral side surface) of the ring-shaped flange portion 13F is flush with the first housing portion 11A1 and the second housing portion 11A2 without a difference in level and is part of the housing 10A as illustrated in FIGS. 6A and 6B. That is, the diameter of the peripheral portion of the ring-shaped flange portion 13F is selected to be equal to the outer diameter of the first housing portion 11A1 and the second housing portion 11A2.

The pen tip side that is one side of the tubular coupling member 13 in the axial direction with respect to the ring-shaped flange portion 13F is a first fitting tubular portion 13a (see FIGS. 6B and 7) fitted to the cylindrical shape portion 11A1a of the first housing portion 11A1. The outer diameter of the first fitting tubular portion 13a of the tubular coupling member 13 is equal to or slightly smaller than the inner diameter on the opening side of the cylindrical shape portion 11A1a of the first housing portion 11A1. The first housing portion 11A1 is pressed, fitted, and coupled at the location of the ring-shaped flange portion 13F.

The back end side of the tubular coupling member 13 in the axial direction with respect to the ring-shaped flange portion 13F is a second fitting tubular portion 13b fitted to the second housing portion 11A2. The outer diameter of the second fitting tubular portion 13b of the tubular coupling member 13 is equal to or slightly smaller than the inner diameter of the second housing portion 11A2. The second housing portion 11A2 is pressed, fitted, and coupled at the location of the ring-shaped flange portion 13F.

The first housing portion 11A1 and the second housing portion 11A2 are inserted into, fitted, and coupled to the tubular coupling member 13 as indicated by arrows in FIG. 7, and in this state, the housing 10A as one tubular body is formed as illustrated in FIGS. 6A and 6B. In this case, the peripheral side surface of the cylindrical shape portion 11A1a of the first housing portion 11A1, the peripheral side surface of the second housing portion 11A2, and the end surface (peripheral surface) of the ring-shaped flange portion 13F are flush with each other as described above. The first housing portion 11A1 and the second housing portion 11A2 made of a conductive material are not in contact with each other and are electrically separated (insulated) from each other due to the existence of the ring-shaped flange portion 13F of the tubular coupling member 13.

In the electronic pen 1A of the second embodiment, the first housing portion 11A1 is arranged to cover around the core main body portion 22 of the core body 20 inserted into a tubular conductor 60A as described later and provides a peripheral electrode. Therefore, the first housing portion 11A1 included in the peripheral electrode and the circuit unit of the printed circuit board 41 need to be electrically connected. A configuration for this will be described.

As illustrated in FIGS. 6B and 7, a recessed groove 13c is formed on the peripheral side surface of the tubular coupling member 13 in the direction along the axial direction of the tubular coupling member 13, from the first fitting tubular portion 13a, below the ring-shaped flange portion 13F, and across the second fitting tubular portion 13b. In this case, the recessed groove 13c is formed below the ring-shaped flange portion 13F, up to the middle part of the ring-shaped flange portion 13F, on the peripheral side surface of the first fitting tubular portion 13a. The recessed groove 13c is formed throughout the entire axial direction on the peripheral side surface of the second fitting tubular portion 13b.

As illustrated in FIG. 7, a connection terminal conductor 14 made of a conductor material, conductor metal in this example, is arranged in the recessed groove 13c. In this case, as illustrated in FIGS. 6B and 7, at least part of an end portion 14a of the connection terminal conductor 14 arranged in the recessed groove 13c on the first fitting tubular portion 13a side of the tubular coupling member 13 is arranged to protrude a little more than the peripheral surface of the first fitting tubular portion 13a. However, the end portion 14a can be elastically pressed downward when the end portion 14a is pressed from above.

Therefore, when the first housing portion 11A1 is fitted to the first fitting tubular portion 13a of the tubular coupling member 13, the end portion 14a of the connection terminal conductor 14 and the inner wall of the first housing portion 11A1 are surely brought into contact with each other, and the first housing portion 11A1 and the connection terminal conductor 14 are electrically connected.

Note that the depth of the part of the recessed groove 13c provided on the second fitting tubular portion 13b side of the tubular coupling member 13 is deep, and the upper surface of the connection terminal conductor 14 arranged in the recessed groove 13c is at a position lower than the peripheral side surface position of the second fitting tubular portion 13b.

In this way, when the second housing portion 11A2 is fitted to the second fitting tubular portion 13b of the tubular coupling member 13, electrical separation (insulation) of the upper surface of the connection terminal conductor 14 in the recessed groove 13c and the inner wall surface of the second housing portion 11A2 is realized.

As illustrated in FIGS. 6B and 7, an end portion 14b extended toward the printed circuit board 41 of the connection terminal conductor 14 is bent and electrically connected to the printed circuit board 41.

Note that, instead of adjusting the depth of the recessed groove 13c, the upper surface of the connection terminal conductor 14 of the recessed groove 13c may be covered by an insulating layer in the second fitting tubular portion 13b to more surely realize the insulation of the connection terminal conductor 14 and the second housing portion 11A2.

In the electronic pen 1A of the second embodiment, the inner diameter of the first housing portion 11A1 up to the tapered portion 11A1b excluding the opening side where the cylindrical shape portion 11A1a is fitted to the first fitting tubular portion 13a of the tubular coupling member 13 is selected to be equal to the inner diameter of the tubular coupling member 13 as illustrated in FIG. 6B.

The front cap 12A made of an insulating material, such as a resin, is inserted and attached from the opening 11A1c (see FIG. 7) side on the pen tip side of the tapered portion 11A1b of the first housing portion 11A1 as illustrated in FIGS. 6A and 6B.

The front cap 12A of the electronic pen 1A in this embodiment includes a protrusion portion 12Aa protruding from the opening 11A1c side on the pen tip side of the tapered portion 11A1b of the first housing portion 11A1 and a tubular portion 12Ab with an outer diameter equal to or a little smaller than the inner diameter of the tubular first housing portion 11A1 and the inner diameter of the tubular coupling member 13 as illustrated in FIG. 6B.

The protrusion portion 12Aa of the front cap 12A is formed such that the external shape is gradually tapered and continuous with the tapered portion 11A1b of the first housing portion 11A1. In this example, the protrusion portion 12Aa includes the opening 12Ac with an inner diameter a little larger than the maximum external shape of the tip portion 21 of the core body 20. The length in the axial direction of the tubular portion 12Ab of the front cap 12A is a length from the first housing portion 11A1 to the tubular coupling member 13 as illustrated in FIG. 6B.

As illustrated in FIG. 6B, the tubular conductor 60A with a cylindrical shape in this example is attached and fixed by, for example, pressing and fitting the tubular conductor 60A into the tubular portion 12Ab of the front cap 12A in this embodiment. Therefore, the tubular conductor 60A and the first housing portion 11A1 made of conductive metal are insulated by the front cap 12A.

The inner diameter of the tubular conductor 60A is larger than the outer diameter of the core main body portion 22 of the core body 20, and the core main body portion 22 of the core body 20 is inserted into the tubular conductor 60A. The tubular conductor 60A in this example is made of conductive metal, such as SUS, similar to the tubular conductor 60 in the example described above. Note that the method of fixing the tubular conductor 60A to the tubular portion 12Ab of the front cap 12A is not limited to the pressing and fitting, and it is obvious that the tubular conductor 60A may be, for example, bonded.

The length in the axial direction of the tubular conductor 60A is selected to be a length shorter than the length in the axial direction of the core main body portion 22 of the core body 20. In this example, a part exposed to the outside without being covered by the front cap 12A is formed on a part of the tubular conductor 60A on the opposite side of the tip portion 21 side of the core body 20. One end 61Aa of a connection wire 61A as a connection member for electrical connection to the output end of the signal transmission circuit is, for example, soldered and connected to the part of the tubular conductor 60A exposed to the outside.

The connection wire 61A is guided along a recessed groove formed on the outer surface of a tubular portion 402A of a board holder 40A that houses a pen pressure detector 50A described later, and another end 61Ab of the connection wire 61A is led toward the printed circuit board 41. The other end 61Ab of the connection wire 61A is, for example, soldered and connected to a conductor pattern where the output end of the signal transmission circuit is connected, on the back surface side of the printed circuit board 41 in this example.

In the electronic pen 1A of the second embodiment, the pen pressure detector 50A is provided in the second fitting tubular portion 13b of the tubular coupling member 13. The board holder 40A for placing the printed circuit board 41 on a board mounting table portion 401A is arranged on the back end side of the pen pressure detector 50A in the axial direction of the housing 10A of the electronic pen 1A. As in the first embodiment, the board holder 40A is arranged such that the board holder 40A cannot move in the axial direction in the housing 10A.

The configuration of the pen pressure detector 50A is the same as the configuration of the pen pressure detector 50 in the first embodiment, and the pen pressure detector 50A includes pressure sensing components including a plurality of components including the dielectric 51, the spacer member 52, the conductive elastic member 53, and the engagement member 54. In the second embodiment, the board holder 40A includes the tubular portion 402A on the core body 20 side with respect to the board mounting table portion 401A in the axial direction, as in the first embodiment. In the second embodiment, the tubular portion 402A is positioned in the hollow portion of the tubular coupling member 13 as illustrated in FIG. 6B.

In the second embodiment, the tubular portion 402A can house the pressure sensing components of the pen pressure detector 50A as in the pressure sensing component holding portion 403 of the first embodiment. The conductive elastic member 53, the spacer member 52, the dielectric 51, and the engagement member 54 are arranged in a line in the axial direction from the pen tip side, and the pressure sensing components included in the pen pressure detector 50A are housed in the tubular portion 402A.

In this way, the electronic pen 1A of the second embodiment does not include the pressure sensing component holding portion 403 unlike in the first embodiment, and the pressure sensing components are directly housed in the tubular portion 402A of the board holder 40A to further reduce the thickness of the electronic pen 1A. Specifically, the tubular coupling member 13 is provided in the second embodiment, and the tubular coupling member 13 also plays a role of an outer housing of the pen pressure detector 50A. The tubular portion 402A of the board holder 40A serves as a pressure sensing component holding portion in the second embodiment.

In the electronic pen 1A configured as described above, the core main body portion 22 of the core body 20 is inserted from the opening 12a of the front cap 12A and pierced through the tubular conductor 60A fixed to the front cap 12A, and the end portion 22b of the core main body portion 22 of the core body 20 is fitted to the fitting recessed portion 53a of the conductive elastic member 53 of the pen pressure detector 50A as illustrated in FIG. 6B. In this example, the core body 20 is also fitted such that the core body 20 can be inserted into and removed from the conductive elastic member 53.

The board holder 40 provided with the printed circuit board 41 mounted on the board mounting table portion 401 and the battery 42 as a power supply are housed in the hollow portion of the second housing portion 11A2 of the electronic pen 1A in the second embodiment as illustrated in FIG. 6B. The back end side of the second housing portion 11A2 is blocked by the back cap 30 as illustrated in FIG. 6A. Note that, in this embodiment, the second housing portion 11A2 made of a conductive material is electrically connected to a copper foil pattern of an earth line of the printed circuit board 41.

In the electronic pen 1A of the second embodiment, a circuit unit is also provided on the printed circuit board 41, the circuit unit including: an integrated circuit (IC) including a signal generation circuit that generates a signal sent out from the core body 20 and a control circuit that controls transmission of the signal from the signal generation circuit to the core body 20; and peripheral circuit components of the IC. Although not illustrated, the peripheral circuit unit includes a push switch (side switch) and a charging circuit of the battery 42. The configuration of the signal processing circuit in the electronic pen 1A of the second embodiment is similar to the configuration described with reference to FIG. 3.

The electronic pen 1A of the second embodiment is configured in this way. Therefore, only the tubular conductor 60A and the connection wire 61A need to be provided to supply the signal from the signal transmission circuit 502 to the core body 20 as in the first embodiment, and the elastic member does not have to be used for the connection member. This can easily reduce the thickness of the electronic pen 1A, and there is an advantageous effect that the variations in characteristics of the pen pressure detector 50A can be reduced.

In the electronic pen 1A of the second embodiment, the housing 10A is separated into the first housing portion 11A1 and the second housing portion 11A2, and the first housing portion 11A1 and the second housing portion 11A2 are fitted to one side and another side in the axial direction of the tubular coupling member 13, respectively. The tubular coupling member 13 in this embodiment houses the tubular portion 402A of the board holder 40A that houses the pressure sensing components included in the pen pressure detector 50A.

Therefore, in the electronic pen 1A of the second embodiment, the tubular coupling member 13 plays a role of the tubular portion 402 in the electronic pen 1 of the first embodiment, and the tubular portion 402A plays a role of the pressure sensing component holding portion in the electronic pen 1 of the first embodiment. The thickness of the electronic pen 1A in the second embodiment can be smaller than the thickness of the electronic pen 1 in the first embodiment.

In the existing electronic pen 100 illustrated in FIGS. 9A and 9B and the electronic pen 1 of the first embodiment, the front cap 102 or 12 that is an insulating material is placed between the housing 101 and the peripheral electrode 114 or between the housing 10 and the peripheral electrode 62. In the electronic pen 1A of the second embodiment, the electrical separation (insulation) between the first housing portion 11A1 included in the peripheral electrode and the second housing portion 11A2 is realized by placing the ring-shaped flange portion 13F of the tubular coupling member 13 in the axial direction. The first housing portion 11A1 and the second housing portion 11A2 can be lined up in the axial direction, and the thickness can be reduced.

The electrical separation (insulation) between the first housing portion 11A1 as a peripheral electrode and the core body 20 can be realized just by providing the tubular-shaped front cap 12A on the opening side of the first housing portion 11A1.

In the second embodiment, the tubular conductor 60A can be fixed and attached to the front cap 12A, and the tubular conductor 60A can be easily arranged to cover the area up to the position near the tip portion 21 of the core main body portion 22 of the core body 20.

Note that, in the second embodiment, the set of the first fitting tubular portion 13a of the tubular coupling member 13 and the first housing portion 11A1 and the set of the second fitting tubular portion 13b of the tubular coupling member 13 and the second housing portion 11A2 are pressed and fitted to couple each other to thereby provide the housing 10A. However, instead of pressing and fitting, the components may be screwed with each other. A ring-shaped projection portion may be provided on one of the first fitting tubular portion 13a of the tubular coupling member 13 and the first housing portion 11A1 or on one of the second fitting tubular portion 13b of the tubular coupling member 13 and the second housing portion 11A2, and a corresponding ring-shaped recessed portion may be provided on the other. In this way, the ring-shaped projection portion and the ring-shaped recessed portion may be used to engage and fit the components with a click sound.

In the second embodiment, the outer diameter of the end surface of the ring-shaped flange portion 13F of the tubular coupling member 13, the outer diameter of the first housing portion 11A1, and the outer diameter of the second housing portion 11A2 are all the same, and the housing 10A has a shape without recessed and projected areas in the axial direction. However, the outer diameter of the end surface of the ring-shaped flange portion 13F of the tubular coupling member 13, the outer diameter of the first housing portion 11A1, and the outer diameter of the second housing portion 11A2 may not be all the same.

In the second embodiment, the tubular portion 402A of the board holder 40A is housed in the hollow portion of the tubular coupling member 13. However, the end portion in the axial direction of the second fitting tubular portion 13b of the tubular coupling member 13 and the end portion in the axial direction of the tubular portion 402A of the board holder 40A may be simply abutted against and coupled to each other.

The holding unit of the pressure sensing components of the pen pressure detector 50A may not be integrated with the board holder 40A, and the hollow portion of the tubular coupling member 13 may serve as the holding unit.

The tubular coupling member 13 and the board holder 40A may also be integrated. In this case, the outer diameter of the part of the board holder 40A can be smaller than the outer diameter of the second fitting tubular portion 13b of the tubular coupling member 13 to facilitate the housing in the second housing portion 11A2.

Although not only the first housing portion 11A1, but also the second housing portion 11A2 is made of a conductive material in the second embodiment, the second housing portion 11A2 may not be made of a conductive material, and the second housing portion 11A2 may be made of an insulating material, such as a resin.

Other Embodiments or Modifications

Figure 8A:
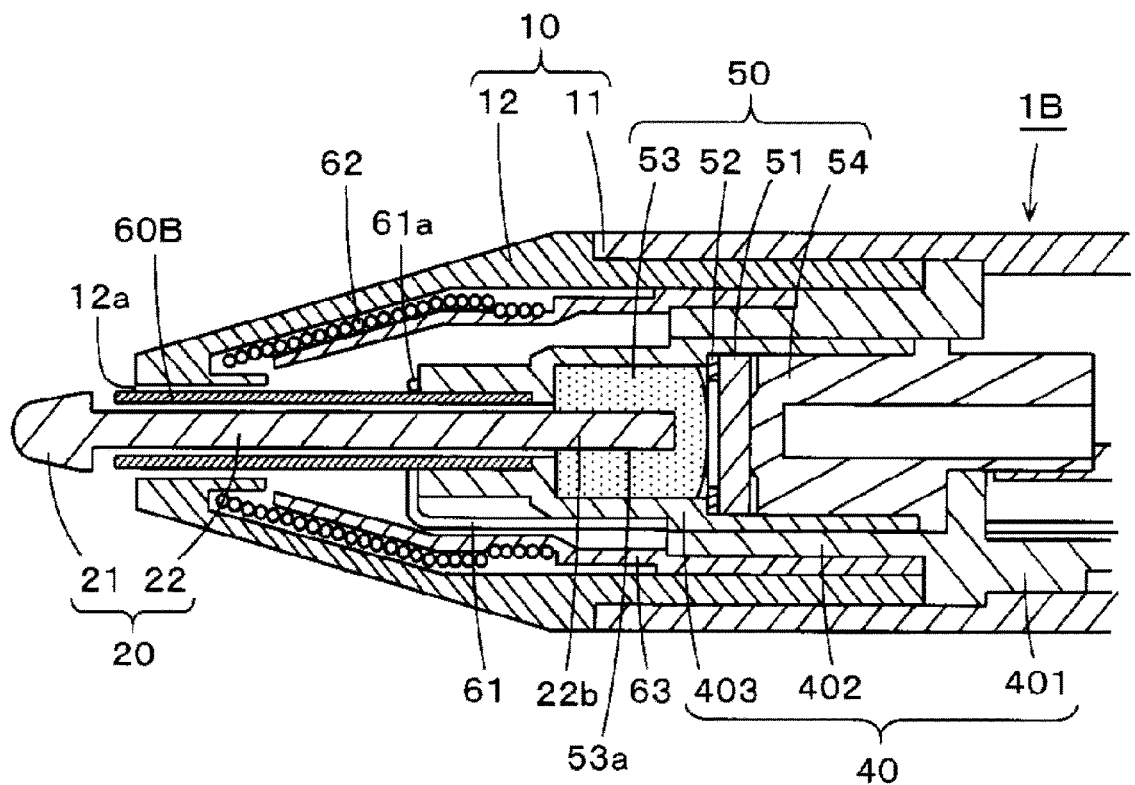
FIGS. 8A and 8B are diagrams for describing parts of a capacitive-coupling electronic pen according to other embodiments of the present disclosure.
Figure 8B:
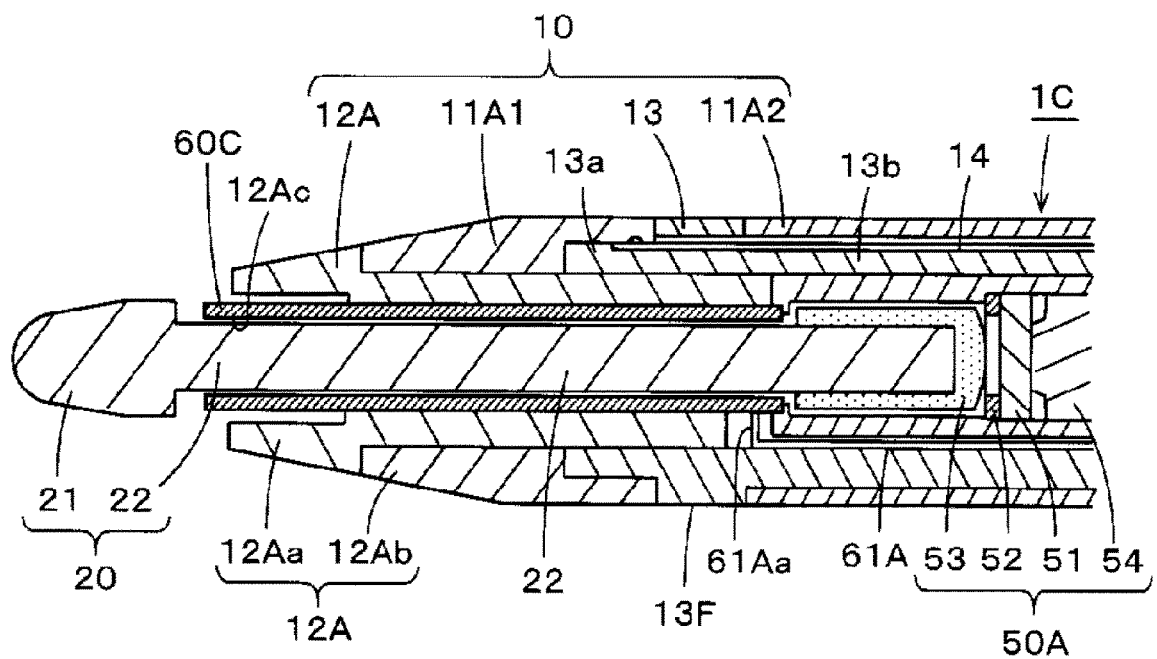

Although the tubular conductors 60 and 60A are arranged not to protrude outside from the openings of the front caps 12 and 12A in the electronic pen 1 of the first embodiment and the electronic pen 1A of the second embodiment, the end portions of the tubular conductors 60 and 60A on the tip portion 21 side of the core body 20 may protrude outside from the openings 12a and 12Ac of the front caps 12 and 12A as illustrated in FIGS. 8A and 8B.

FIG. 8A depicts a configuration example of a pen tip side of an electronic pen 1B in an improvement example of the electronic pen 1 of the first embodiment. In FIG. 8A, the same reference signs are provided to the same parts as the electronic pen 1 of the first embodiment, and the description will not be repeated.

In the electronic pen 1B of this example, the length in the axial direction of a tubular conductor 60B fitted and attached to the pen tip side of the pressure sensing component holding portion 403 is increased so that an end portion of the tubular conductor 60B on the tip portion 21 side of the core body 20 protrudes outside from the opening 12a of the front cap 12 as illustrated in FIG. 8A. In this example, the inner diameter of the opening 12a of the front cap 12 is selected to be larger than the outer diameter of the tubular conductor 60B. Other configurations of the electronic pen 1B in this example are similar to the configurations of the electronic pen 1 in the first embodiment.

FIG. 8B depicts a configuration example of a pen tip side of an electronic pen 1C in an improvement example of the electronic pen 1A of the second embodiment. In FIG. 8B, the same reference signs are provided to the same parts as the electronic pen 1A of the second embodiment, and the description will not be repeated.

In the electronic pen 1C of this example, the length in the axial direction of a tubular conductor 60C attached to the front cap 12A is increased so that an end portion of the tubular conductor 60C on the tip portion 21 side of the core body 20 protrudes outside from the opening 12Ac of the front cap 12A as illustrated in FIG. 8B. In this example, the tubular conductor 60C is fixed to the front cap 12A, and this is similar to the second embodiment. Other configurations of the electronic pen 1C in this example are similar to the configurations of the electronic pen 1 in the first embodiment.

According to the electronic pens 1B and 1C of the modifications, in addition to the advantageous effects of the electronic pen 1 of the first embodiment and the advantageous effects of the electronic pen 1A of the second embodiment, there are remarkable effects that the coupling position of the tubular conductor 60B or 60C, which transmits the signal from the signal transmission circuit to the core body 20, and the core body 20 can be easily set to a position close to the tip portion 21 of the core body 20, and the coupling portion of the close position of the tip portion 21 of the core body 20 and the tubular conductor 60B or 60C can be closer to the input surface of the position detection sensor. In this case, the coupling of signal transfer between the tubular conductor 60B or 60C and the position detection sensor can strengthen the coupling of signal transfer between the electronic pen 1B or 1C and the position detection sensor. In addition, the tubular conductor is metallic and strong, and the pen tip can be thin and elongated. Therefore, the visibility of the pen tip can be increased as in a mechanical pencil.

Although the end portion 22b of the core main body portion 22 of the core body 20 is directly fitted to the fitting recessed portion 53a provided on the conductive elastic member 53 of the pen pressure detectors 50 and 50A in the first and second embodiments, a pressure transmission member may be placed between the end portion 22b of the core main body portion 22 of the core body 20 and the conductive elastic member 53 of the pen pressure detectors 50 and 50A.

Although the peripheral electrode is used for detecting the tilt angle with respect to the input surface of the position detection sensor of the electronic pen in the embodiments, the peripheral electrode may be used for other applications. For example, the peripheral electrode may be used for receiving a signal from the position detection apparatus through the position detection sensor. The peripheral electrode may also be used as a transmission electrode of information transmitted from the electronic pen to the position detection apparatus through the position detection sensor.

Although the core body 20 only transmits a signal to the position detection sensor in the electronic pens 1, 1A, 1B, and 1C of the embodiments, the core body 20 may transmit a signal to the position detection sensor and receive a signal from the position detection sensor in time division in the electronic pen.

Although the signals are transmitted and received only between the core body 20 or the peripheral electrode and the position detection sensor of the position detection apparatus in the electronic pens of the embodiments, the electronic pens may be configured to use wireless communication means of, for example, a Bluetooth (registered trademark) standard to transmit and receive signals to and from the position detection apparatus through wireless communication.

In the embodiments, the pen pressure detector presses the conductive elastic member against one end surface (one electrode surface) of the dielectric through the ring-shaped spacer member according to the pen pressure and changes the contact area of the dielectric and the conductive elastic member according to the pen pressure to thereby provide a variable capacitor that indicates capacitance corresponding to the pen pressure between the one end surface and the other end surface (other electrode surface) of the dielectric. However, the configuration of the pen pressure detector is not limited to this. For example, the dielectric may be placed between the terminal member and the conductive elastic member to provide a variable capacitor, or a semiconductor element as a variable capacitor including a micro electro mechanical systems (MEMS) element may also be used, in which the capacitance changes according to the pen pressure, as disclosed in, for example, Japanese Patent Laid-Open No. 2013-161307.

Instead of providing the pen pressure detector as a variable capacitor, the pen pressure detector may be configured to change the inductance value according to the pen pressure.

Although the peripheral electrode includes one conductive member in the embodiments, the peripheral electrode may be divided in the circumferential direction to provide a plurality of conductive members, such as two or three conductive members. Signals may be independently supplied to the plurality of conductive members to allow transmitting the signals to the position detection sensor. In this case, the position detection apparatus can also detect the angle of rotation of the electronic pen.

The tubular conductors 60 and 60A are made of conductive metal in the embodiments. However, instead of metal, the tubular conductors 60 and 60A may be made of a hard resin formed by, for example, mixing conductive metal powder to provide conductivity.

Although the tubular conductors 60A and 60C are fixed to the front cap 12A in the examples of the second embodiment and the embodiment in FIG. 8B, the method of attaching the tubular conductors 60A and 60C to the fixation positions in the housings of the electronic pens 1A and 1C is not limited to this. For example, the tubular conductors 60A and 60C may be fixed to the tubular portion that holds the pen pressure detector 50A as in the first embodiment.

It is to be noted that the embodiments of the present disclosure are not limited to the foregoing embodiments, and that various changes can be made without departing from the spirit of the present disclosure.

What is claimed is:

1. A capacitive-coupling electronic pen comprising:
    a tubular housing;
    a signal transmission circuit arranged in the housing;
    a tubular conductor fixed and arranged at a predetermined position in the housing such that an axial direction of the tubular conductor corresponds to an axial direction of the housing;
    a conductive core body including a front end protruding from an opening on one side of the housing in the axial direction of the housing, and an opposite end that is opposite the front end and that is inserted into a hollow portion of the tubular conductor such that the opposite end is movable; and
    a connection member that electrically connects the signal transmission circuit and the tubular conductor,
    wherein a signal from the signal transmission circuit is transmitted to the core body through capacitive coupling between the tubular conductor and the core body and transmitted to an outside of the electronic pen from a tip portion of the core body when the tubular conductor electrically connected to the signal transmission circuit and the core body are not in contact with each other, and
    wherein a peripheral electrode is provided that covers around the tubular conductor into which the core body is inserted, and the peripheral electrode is also capacitive-coupled to a position detection sensor to transfer a signal.

2. The capacitive-coupling electronic pen according to claim 1, wherein:
    the tubular conductor is fixed closer to the opening on the one side of the housing in a holder fixed and arranged at a position between the tubular conductor and the signal transmission circuit in the axial direction of the housing.

3. The capacitive-coupling electronic pen according to claim 2, wherein:
    an end portion of the core body on the opposite end of the core body is pierced through the tubular conductor and fitted to a fitting portion of a fitting member provided on the holder.

4. The capacitive-coupling electronic pen according to claim 3, wherein:
    the core body is fitted to the fitting member provided on the holder such that the core body is capable of being inserted into and removed from the fitting member.

5. The capacitive-coupling electronic pen according to claim 2, wherein:
    the holder holds a pen pressure detector that includes a plurality of pressure sensing components which, in operation, detect a pen pressure applied to the front end of the core body.

6. The capacitive-coupling electronic pen according to claim 2, wherein:
    an end portion of the core body on the opposite end of the core body is pierced through the tubular conductor and fitted to a fitting portion of a fitting member provided on the holder such that the end portion is insertable into and removable from the fitting portion,
    the fitting member is arranged in the holder such that the fitting member is displaceable in the axial direction of the housing along with the core body when the core body is displaced in the axial direction of the housing according to the pen pressure applied to the front end of the core body, and
    the holder holds a plurality of pressure sensing components which, in operation, detect pressure transmitted through the core body and the fitting member to detect the pen pressure applied to the front end of the core body.

7. The capacitive-coupling electronic pen according to claim 2, wherein:
    the connection member is provided to go around the holder and electrically connect the tubular conductor and the signal transmission circuit.

8. The capacitive-coupling electronic pen according to claim 2, wherein:
    the connection member is formed on an outer surface of the holder.

9. The capacitive-coupling electronic pen according to claim 1, wherein:
    an insulating member is provided between the tubular conductor and the peripheral electrode.

10. The capacitive-coupling electronic pen according to claim 1, wherein:
    the peripheral electrode receives, through the position detection sensor, a signal from a position detection apparatus including the position detection sensor capacitive-coupled to the core body.

11. The capacitive-coupling electronic pen according to claim 1, wherein:
    a tilt angle of the axial direction of the core body with respect to an input surface of the position detection sensor is detectable using the peripheral electrode.

12. The capacitive-coupling electronic pen according to claim 1, wherein
    the peripheral electrode is attached such that the peripheral electrode is exposed to the outside of the electronic pen.

13. The capacitive-coupling electronic pen according to claim 1, wherein:
    the front end of the tubular conductor protrudes outside of the electronic pen from the opening on the one side of the housing.
14. The capacitive-coupling electronic pen according to claim 1, wherein:
    the tubular conductor is made of conductive metal.

* * * * *